United States Patent [19]

Halla

[11] Patent Number: 4,924,815

[45] Date of Patent: May 15, 1990

[54] COLLAR

[76] Inventor: Mark Halla, 502 Chalfonte Dr., Catonsville, Md. 21228

[21] Appl. No.: 234,622

[22] Filed: Aug. 22, 1988

[51] Int. Cl.⁵ ............................................. A01K 27/00
[52] U.S. Cl. ..................................................... 119/106
[58] Field of Search ........................................ 119/106

[56] References Cited

U.S. PATENT DOCUMENTS

| | | | |
|---|---|---|---|
| 188,043 | 3/1877 | Elmore | 119/106 |
| 2,859,732 | 11/1958 | Driscoll | 119/106 |

FOREIGN PATENT DOCUMENTS

| | | | |
|---|---|---|---|
| 3044506 | 8/1981 | Fed. Rep. of Germany | 119/106 |
| 831822 | 3/1960 | United Kingdom | 119/106 |

*Primary Examiner*—Robert P. Swiatek
*Attorney, Agent, or Firm*—James R. Cwayna

[57] ABSTRACT

An animal collar particularly adapted for dogs including a relatively flat, wide, belt portion with slide keepers for adjusting the length of the belt portion and providing a loop, due to the doubling of the belt through the keeper portions, with an attachment member through each of the loops through which a continuous leash attachment element is arranged. By applying leash pressure to the continuous element the collar size will be reduced in diameter such that a choking effect is provided for controlling the dog. The connective element may be chain or other materials dependent upon the size of the dog.

3 Claims, 1 Drawing Sheet

COLLAR

FIELD OF THE INVENTION

The field of the invention relates generally to dog collars and more particularly to a choker type collar having a wide belt portion and a continuous belt connecting and leash attachment portion.

SHORT SUMMARY OF THE INVENTION

The collar of the invention includes a belt portion of webbing or the like which is of a width to provide a substantial contact area with the animal so as not to cut into the skin of the dog when pressure is applied thereto. A pair of slide keepers are provided on the ends of the belt section for adjustment of the ultimate length thereof and the two slide keepers allow dual adjustment of the belt length such that a second continuous connective element received at the ends of the belt will be positioned at the back of the dog's neck and will not tend to shift to one side of the dog to thereby insure that the belt portion is over the frontal neck portion of the dog.

The slide keepers, when positioned on the belt form a pair of loops at the now belt ends and a pair of connective element receiving means are provided within these loops. The connective element is provided in at least two forms.

A first form of the connective element is a chain with a connector incorporated therein for joining the ends of the chain to form the continuous connector, which connector also provides joinder for the belt ends and a leash attachment member.

A second form of the connective element is a cloth, plastic or other fiber, rope or line which is received through the attachment means provided at the respective ends of the belt section. This line connector is particularly directed to use with smaller dogs which may be bothered by the use of a heavier chain. Again, in this form, the ends of this rope or line are provided with a leash attachment device such as a simple ring.

BACKGROUND AND OBJECTS OF THE INVENTION

Applicant is well aware that various dog collars including choke collars are present in the prior patent and commercial art. Simple belt type collars are not applicable to this invention as they apply no choking or control pressure. In his search of the prior art applicant has found Elsinger U.S. Pat. No. 2,614,533; and Johnson U.S. Pat. No. 770,070 that appear to be at least applicable to the concept of a choker-belt collar.

The Patent to Elsinger includes a wide belt portion which provides only one adjustable feature for such belt portion and in use, with the manner in which the Elsinger device is constructed, this adjustment portion will be at the frontal neck portion of the dog and may cut into the dog's neck. The Elsinger Patent also discloses a complex chain connector to connect the belt ends with the chain connector portions crossing each other which would not necessarily allow a free and unimpeded choking or tightening effect.

The Patent to Johnson is a belt unit consisting of two belts in which the frontal belt portion includes only one adjustment feature while the back belt section contains no adjustment features and comprises another belt.

It is an object of the applicant's invention to provide a dog collar which includes a frontal belt portion having means for adjusting the length of such belt portion and providing attachment elements at the ends of the belt such that a connector member may be provided therethrough which connector member is continuous and receives a leash and will upon application of leash pressure tighten the belt around the neck of a dog.

It is a further object of the applicant's invention to provide a dog collar including a frontal belt portion having a pair of slide keepers for engaging the respective ends of the belt for moving the same along the belt for sizing of the belt with attachment means being provided at a formed loop at the ends of the belt portion for receipt of an adjustable connector element therein with the leash being attachable to the connector element with the unit, upon application of leash pressure tightening about the neck of the dog.

It is still a further object of the applicant's invention to provide a dog collar having a relatively wide belt portion with loops formed at the respective ends thereof and attachment elements being received through said attachment means and a leash receiving element joining the ends of the connector element.

It is still a further object of the applicant's invention to provide a dog collar having a belt portion of a predetermined width with attachment means being arranged within loops formed at the ends of the belt to receive a continuous connector therein with means for adjusting the length of the connector and wherein the connector is formed of chain material.

It is still a further object of the applicant's invention to provide a dog collar including a first, relatively wide belt portion with slide keepers to receive the ends of the belt and shiftable along the length of the belt to predetermine a first collar size with attachment means received at the formed loop ends of the belt and a continuous connector receivable through the attachment means with the continuous connector being formed of a fabric or plastic material and having a leash receiving member to attach to the respective ends of the connector member to form the continuous element and a leash being receivable and attachable thereto.

These and other objects and advantages of the applicant's collar will more particularly appear from a consideration of the accompanying disclosure made in association of the drawings.

DESCRIPTION OF THE DRAWINGS

FIG. 4 illustrates a second form of the invention in which the connective element is of fabric or the like.

DESCRIPTION OF A PREFERRED FORM OF THE INVENTION

Figure 1:
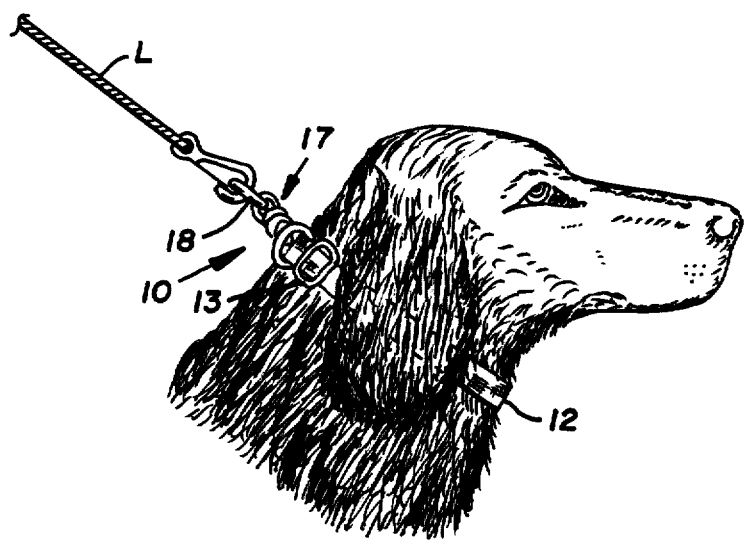
FIG. 1 is a profile view of a dog upon which the collar is positioned.
Figure 2:
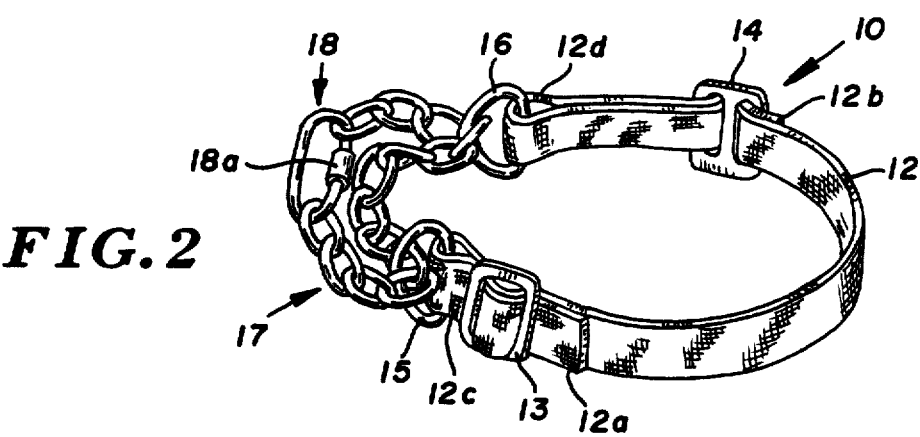
FIG. 2 is a perspective view of a first form of the dog collar in which the connective element is a chain.
Figure 3:
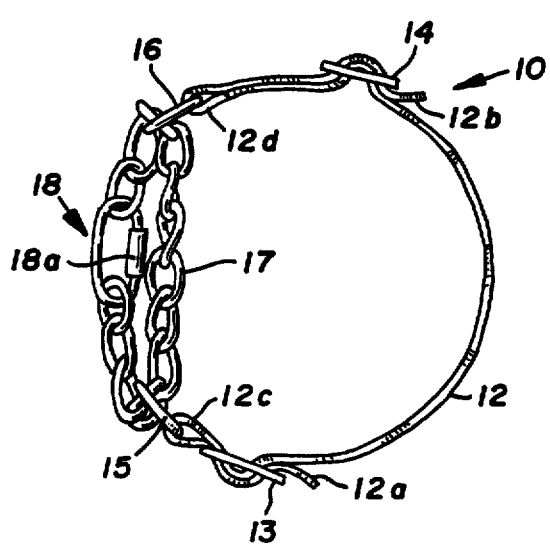
FIG. 3 is a top plan view taken from FIG. 1.
Figure 4:
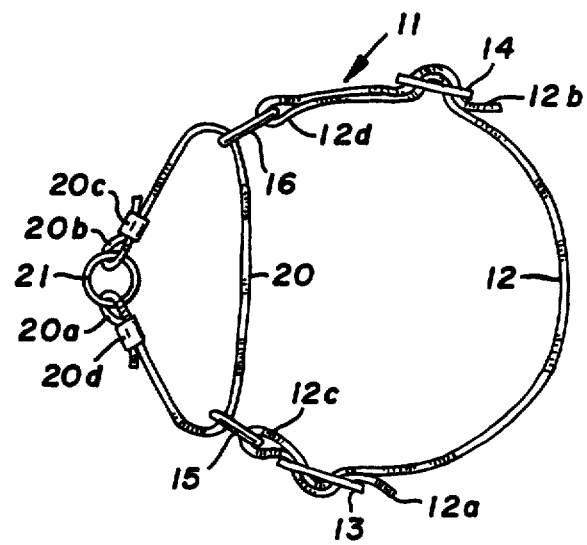

In accordance with the accompanying drawings, applicant's first form of his invention of a dog collar is generally designated 10 and is illustrated in FIGS. 1, 2 and 3 and is designated in its entirety 11 in a modified form of the invention as illustrated in FIG. 4. As illustrated in FIG. 1 the use of either form of the article should be obvious and it should be obvious that a primary utilization of the collar is in training and a leash L will be utilized in conjunction with the collar 10 or 11.

In the first preferred form of the invention the collar 10 includes a first, relatively wide web or leather belt portion 12. A pair of slider buckles or strap slides 13–14 are provided on the respective ends 12a–12b of belt 12 and these slider buckles will serve to increase or decrease the size or circumference of the final collar structure. When the slider buckles 13–14 are utilized, loop areas 12c–12d are formed by the double back of the belt and a pair of attachment members such as D-rings 15–16 are provided within these respective loop areas 12c–12d.

In this first form of the invention a connector in the form of a chain 17 is provided to pass through the attachment members 15–16 and an interconnect member 18 is provided to join the ends of the chain 17 to thus provide a continuous connector element. In the form shown, the particular interconnect 18 is one that is easily opened through the utilization of a threaded sleeve member 18a which will join the ends of the loop connector 18. This interconnect 18 permits further adjustment of the collar length in that this interconnect member 18 may be inserted into any of the links of the chain 17. Member 18 besides connecting selected links of the chain 17 provides a means for attachment of the leash L to the collar 10.

The use of the collar should be obvious to anyone that has ever utilized a dog collar and it should be obvious that applicant's unit provides several advantages. The use of a pair of slide buckles 13–14 permits the relatively wide belt 12 to always be in the frontal area of the dog's neck without locating a buckle or the like at such frontal area. This frontal neck area is the position of pressure when leash pressure is provided either by the trainer or user pulling on the leash or the dog attempting to pull away from the user. When such pressure is applied, the chain member 17 will slip through the attachment D-rings 15–16 to tighten the collar about the neck of the dog and apply controlling pressure to the dog.

A modified form of the invention is illustrated in FIG. 4. In this illustration and with this collar the belt, slide buckles and attachment elements may be identical to those illustrated and described in the description of FIGS. 1, 2 and 3 and therefore the same numbers are utilized to designate such common elements.

The primary difference in this modified form of the invention from the form of FIGS. 1, 2 and 3 is the utilization of a fabric, plastic or similar material as the continuous connector, in this case designated 20. In the form shown a simple rope such as nylon or the like is provided and loops 20a–20b are formed at the respective ends of such member 20 by the use of stake clips 20c–20d or the like. As illustrated, either prior to or after the formation of such loops 20a–20b a leash attachment and end connecting ring 21 is arranged. Although the form of this leash attachment member 21 is illustrated as being circular and continuous it should be obvious that many other shapes of such member may be utilized without departing from the scope of the invention and the unit may be of a split ring or otherwise separable construction.

FIG. 4 particularly illustrates the triangular configuration that will evolve when leash pressure is applied to the collar. This triangular configuration will of course, dependent upon such leash pressure bring the web or belt section of the collar into a tighter, smaller diameter choking condition.

Again, with the form shown in FIG. 4 the positioning of the slide buckles 13–14 adjacent the ends of the belt positions the relatively wide belt against the frontal neck portion of the dog and though a choking technique is applied to the dog the width of the belt will prevent injury to the dog.

It should be obvious that applicant has provided a unique dog collar which affords a wide range of adjustability for the collar portion while always positioning the relatively wide web portion on the frontal area of the dog's neck.

Applicant has utilized the terminology of relatively wide in describing the frontal portion of the collar. Relatively wide is defined in accordance with the size of the particular dog for which the collar is designed. For example, a small dog may be provided with the collar of FIG. 4 which includes the belt portion being at least ¼-inch or more while for a large dog wide may be reflected by a ½-inch or greater dimension. The aspect of the wide or relatively wide terminology is to present a collar which will not injure the dog when leash pressure is applied.

I claim:

1. A dog collar, including:
   a. a relatively wide belt portion having a pair of ends;
   b. a pair of slide means engaging the respective ends of said belt portion and slideable upon the remainder of said belt to reduce the length of the belt and therefore reduce the diameter and circumference of the resultant collar and whereby forming loops at the respective ends of the belt;
   c. attachment means received within the formed belt loops;
   d. a continuous connector member receivable into said attachment means;
   e. means for removably connecting a leash to said continuous connector member; and,
   f. said continuous connector member including a chain with means for interconnecting selected links thereof.

2. The dog collar as set forth in claim 1 and said interconnecting means being separable to permit placement at selected links.

3. The dog collar as set forth in claim 1 and said interconnecting means being of a size to receive selected links of said chain and to receive the leash connection therein.

* * * * *